United States Patent [19]
Fukada

[11] Patent Number: 5,966,347
[45] Date of Patent: Oct. 12, 1999

[54] APPARATUS AND METHOD FOR REPRODUCING DATA FROM A MAGNETO-OPTIC RECORDING MEDIUM

[75] Inventor: Hajime Fukada, Tokyo, Japan

[73] Assignee: LG Electronics Inc., Seoul, Rep. of Korea

[21] Appl. No.: 08/883,371

[22] Filed: Jun. 26, 1997

[30] Foreign Application Priority Data

Jun. 26, 1996 [JP] Japan .................................. 8-166473
Jul. 2, 1996 [JP] Japan .................................. 8-172585

[51] Int. Cl.$^6$ ...................................................... G11B 7/00
[52] U.S. Cl. .............................. 369/13; 369/110; 369/116
[58] Field of Search ............................ 369/13, 100, 110, 369/121, 116, 59

[56] References Cited

U.S. PATENT DOCUMENTS

| | | | |
|---|---|---|---|
| 5,189,659 | 2/1993 | Ohta | 369/44.34 |
| 5,398,227 | 3/1995 | Miyaoka et al. | 369/13 |
| 5,488,604 | 1/1996 | Negishi | 369/13 |
| 5,495,456 | 2/1996 | Oka et al. | 369/13 |
| 5,577,017 | 11/1996 | Yamamoto et al. | 369/110 |
| 5,659,537 | 8/1997 | Hirokane et al. | 369/13 |
| 5,681,633 | 10/1997 | Onagi et al. | 369/275.3 |
| 5,691,072 | 11/1997 | Izumi et al. | 369/13 |
| 5,701,280 | 12/1997 | Miyashita | 369/13 |

FOREIGN PATENT DOCUMENTS

| | | |
|---|---|---|
| 1 292603 | 11/1989 | Japan . |
| 3 93058 | 4/1991 | Japan . |
| 5 20697 | 1/1993 | Japan . |
| 3 93056 | 4/1997 | Japan . |

Primary Examiner—Thang V. Tran

[57] ABSTRACT

A data reproducing device and method for reproducing data recorded on a magneto-optic recording medium having at least a recording layer and a reproducing layer. The device and method include a beam directing unit for directing a pulsed laser beam having a frequency higher than a frequency of any data signal recorded on the recording layer to reproduce the recorded data, a processing unit for detecting first and second polarized components of the pulsed laser beam reflected from the magneto-optic recording medium and corresponding to a direction of magnetization transferred from the recording layer to the reproducing layer, and outputting a RF signal based on this detection, and a low pass filter for filtering the RF signal to generate a reproduction signal representing the data recorded on the recording layer.

20 Claims, 7 Drawing Sheets

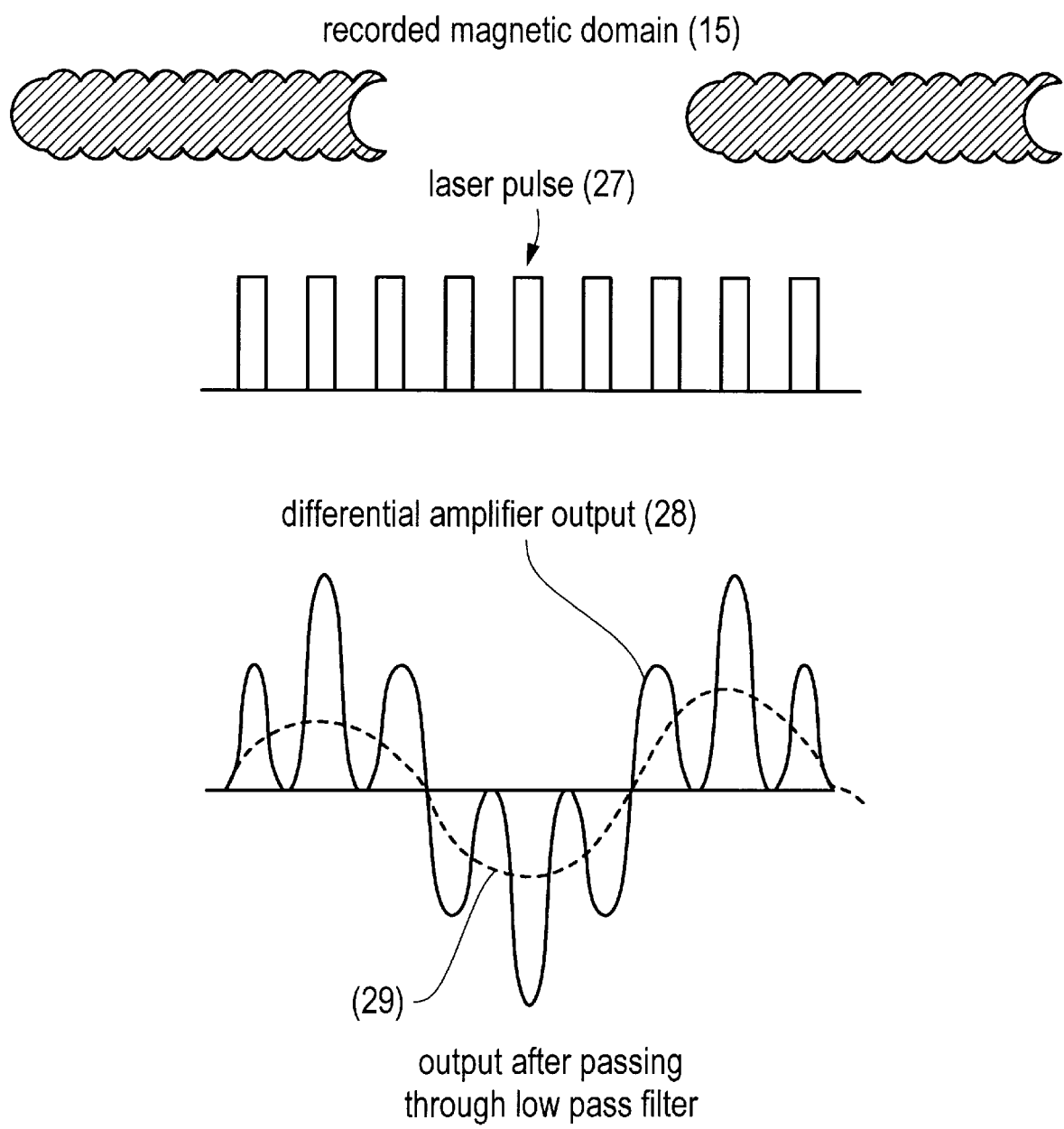

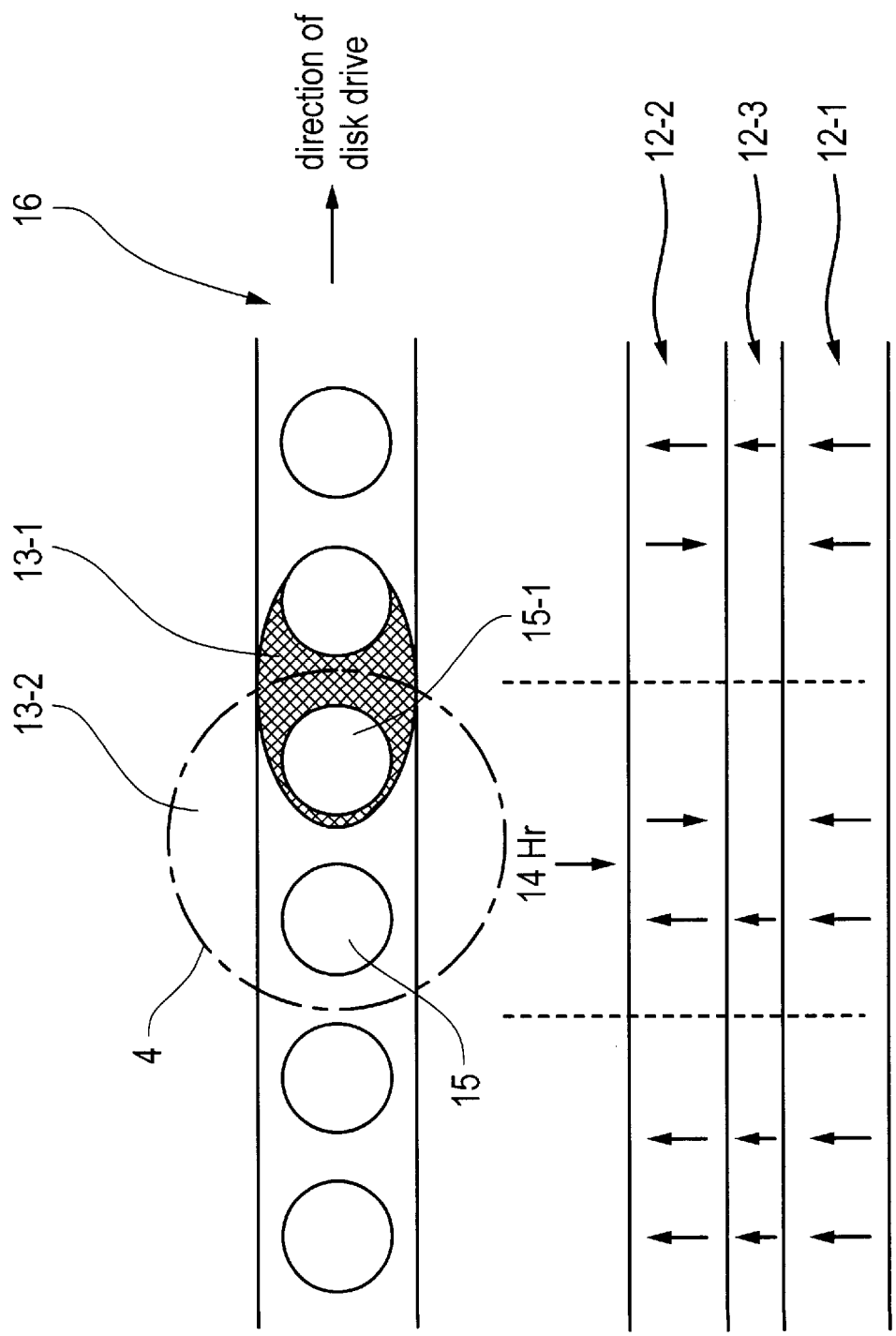

APPARATUS AND METHOD FOR REPRODUCING DATA FROM A MAGNETO-OPTIC RECORDING MEDIUM

BACKGROUND OF THE INVENTION

1. Field of the Invention

The present invention relates to a magnetooptic record reproducing device, and more particularly, to a magnetooptic data record reproducing device which can reproduce magnetooptically recorded data.

2. Discussion of the Related Art

In current systems for recording information with a magnetooptic disk device, a laser beam spot is focused on a surface of the disk, to elevate a temperature of the a film of magnetic recording medium (for example, an alloy of an amorphous rare metal (R) and transition such as TeFeCo or Gb—Tb—Fe) to a temperature of 150–200 deg. C. The laser beam being of a size commensurate with a wavelength modulated into a coded data to be recorded. The recording medium is demagnetized when the temperature of the recording medium is elevated to a temperature above a Curie temperature Tc by the heat from the laser beam. A direct current bias magnetic is applied to the recording medium in one direction using a magnet to cause a magnetization inversion at the heat portion. When the heated portion off the recording medium cools to room temperature, a magnetic domain is recorded. On the other hand, the coded data thus recorded on the disk can be reproduced by focusing a direct current laser beam of predetermined power to a spot size in a range of a wavelength. As a polarity of the laser beam reflected at the surface of the magnetooptic recording medium is changed according to the Kerr effect, the polarity of the reflected laser beam is optically detected to read information magnetized on the disk. In the aforementioned art, which has been put into practical use already in 3.5" or 5.5" magnetooptical disk drive, a spot diameter D of the focused laser beam can be expressed as D–0.5w/Na, where w is a wavelength of the laser beam and NA is a numerical aperture of a lens. Therefore, reading a magnetic pit with a spot of a diameter D–0.62$\mu$ is hardly possible optically, if the wavelength of a semiconductor laser beam w–0.68$\mu$ and the numerical aperture of a lens NA 0.55.

JP Laid Open Patent No. H3-93058 discloses a super resolution reproducing method as a method for reading a magnetic pit d(>D) smaller than an optical spot diameter D, in which a laser beam scans a disk rotated by a power higher than a general reproducing power and information of the magnetic pit smaller than the spot of the laser beam is read utilizing a difference of a temperature distribution of a magnetic film between a central portion and an outer portion of the laser beam spot. And, JP Laid Open Patent No. H5-20697 discloses a method of optical super resolution, in which a center portion of a focusing lens is shielded with an aperture for making the spot diameter D(–0.5w/NA), which is decided according to a wavelength w and numerical aperture NA, smaller. However, this method can not be put into practical use due to reason such as significant affect from side lobes formed in periphery of the focused spot in recording and reproducing and lack of laser power in recording due to the shielding of the center portion of the lens with an aperture.

The problems in the conventional art will be explained with reference to FIGS. 4a and 4b, taking a magnetooptic disk recording system with a laser pulse direction and magnetic field modulation as an example.

FIG. 4a illustrates a sample servo system. A laser element 1 is made to emit a pulsed laser beam (having a waveform represented by reference number 2) under control of a laser driving device 9 in response to a clock signal 10 generated from phase pits in the disk. An objective lens 3 directs an optical spot 4 onto a magnetooptic recording medium 8. In the meantime, a data signal generating device 6 generates a modulation magnetic field 7 using a magnetic head 5 disposed close to the disk. If pulses of the optical spot 4 of the laser beam are directed onto a surface of the disk with a higher frequency of the clock signal 10, the laser beam 2 pulsating synchronized as to the clock 10 and the modulation magnetic field 7 cause the successive optical spots 4 to overlap to cause over write recording, thereby recording with magnetic pits 11 (FIG. 4B) of mark lengths smaller than the diameter D of the optical spot 4.

This method is made known by JP Laid Open Patent No. 111-292603. For example, even though the diameter D=0.62$\mu$ of when the wavelength w" 0.68$\mu$ and the lens numerical aperture NA=0.55, the reduction of pulse intervals makes recording of the shortest mark length D=0.1~0.2 $\mu$ possible. Currently, when a track pitch p=0.6$\mu$ and the shortest mark length d–0.26, a capacity of information recordable on a disk of a diameter 120 mm is 7~10 GB (giga byte). However, reproduction of the magnetic data thus recorded with the shortest mark length d–0.1~0.2$\mu$ using the optical spot with a diameter D=0.62$\mu$(–0.5w/NA) is very difficult.

FIG. 3a illustrates a magnetic super resolution method for reading a magnetic pit of a size smaller than an optical spot 4, made known by JP Laid Open patent No. H3-93056. A magnetooptic film 12 has 2–4 layers of magnetooptic films having magnetic and thermal properties different from one another (recording layer 12-1, reproducing layer 12-2 and switching layer 12-3). When the optical spot 4 scans a track 16 having a magnetic domain recorded within the magnetooptic film 12 as shown in FIG. 3b, photo energy is absorbed by the magnetic medium and converted into heat to form a temperature distribution within the optical spot 4. As a result, in the high temperature region of the spot 4, the switching layer 12-3 is heated to a temperature in the vicinity of a Curie temperature ($T_c \cong 140$ deg. C.), a switched connection force between the recording layer 12-1 and the reproducing layer 12-2 is weakened, and a direction of magnetization of the reproducing layer 12-2 which has a lower coercive force becomes in agreement with the reproducing magnetic field 14. As a result, within the optical spot 4, only a magnetic pit 15 in a low temperature region 13-2 of the spot 4 is read because a magnetic pit 15-1 in the high temperature region 13-1 is masked by the reproducing layer 12-2. However, in this method, although a signal level from a 0.4$\mu$ mark length can achieve a target level of 45 dB, if the mark length is less than 0.3$\mu$, the signal level becomes 30 dB only.

SUMMARY OF THE INVENTION

Accordingly, the present invention is directed to a magnetooptic data record reproducing device that substantially obviates one or more of the problems due to limitations and disadvantages of the related art.

An object of the present invention is to provide a reproducing device which can reproduce a magnetic pit substantially smaller than an optical spot.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the magnetooptic data record reproducing device includes means for directing a pulsed laser beam having a frequency higher than a highest frequency of a data to a disk, the disk having a magnetooptic recording medium on which the data is recorded.

The magnetooptic recording medium is formed of a magnetic super resolution film.

The magnetooptic data record reproducing device further includes a photoelectric conversion element for receiving the pulsed laser beam reflected at the magnetooptic recording medium upon incident thereto, and means for low pass filtering of an output to the photoelectric conversion element.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 1a and 1b illustrate an optical system in combination with a signal processing block diagram showing a magnetic pit reproducing device in accordance with a preferred embodiment of the present invention;

FIGS. 3a and 3b illustrate views for explaining a method for magnetic super resolution reproducing a recorded magnetic pit; and, FIGS. 4a and 4b explain a method in which laser beam pulses are directed and data is magnetic modulated for recording the data.

DETAILED DESCRIPTION OF THE PREFERRED EMBODIMENTS

Reference will now be made in detail to the preferred embodiments of the present invention, examples of which are illustrated in the accompanying drawings.

Figure 1A:
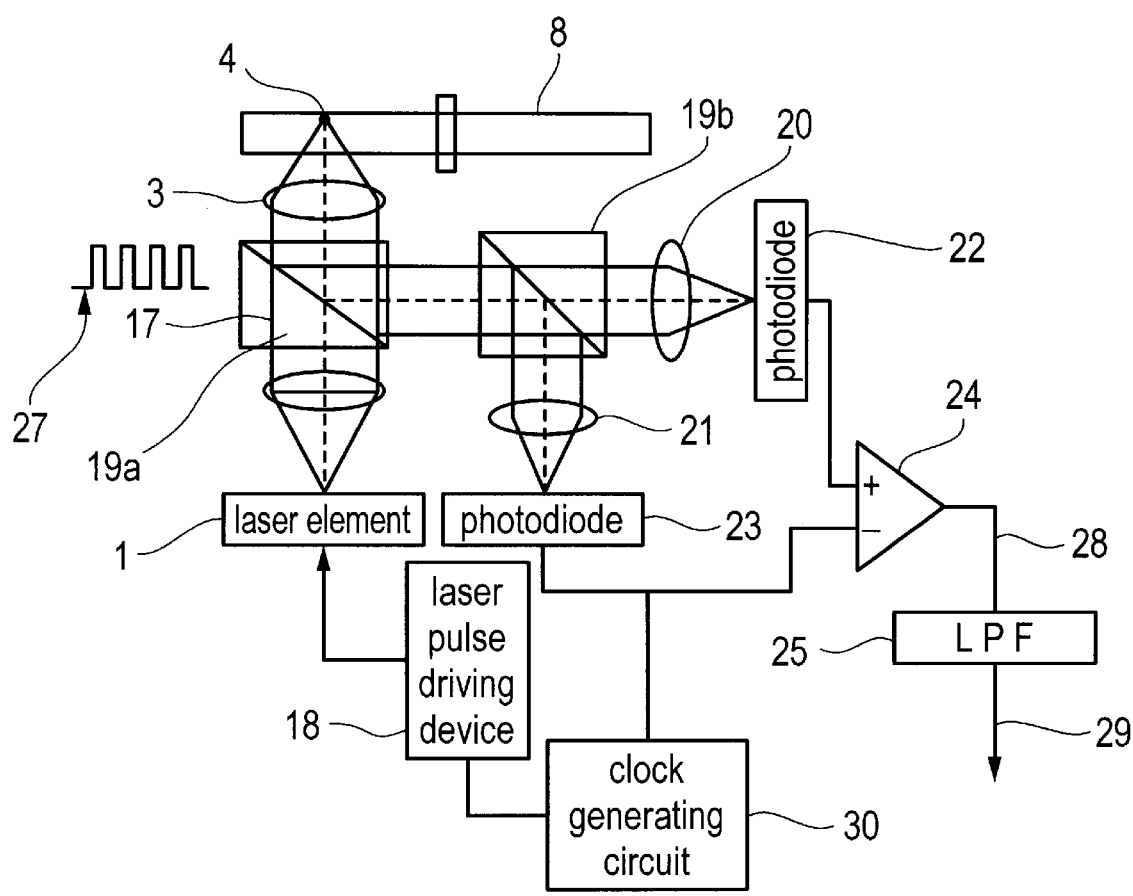

FIGS. 1a and 1b illustrate an optical system in combination with a signal processing block diagram showing a magnetooptical reproducing device in accordance with a preferred embodiment of the present invention.

Figure 4A:
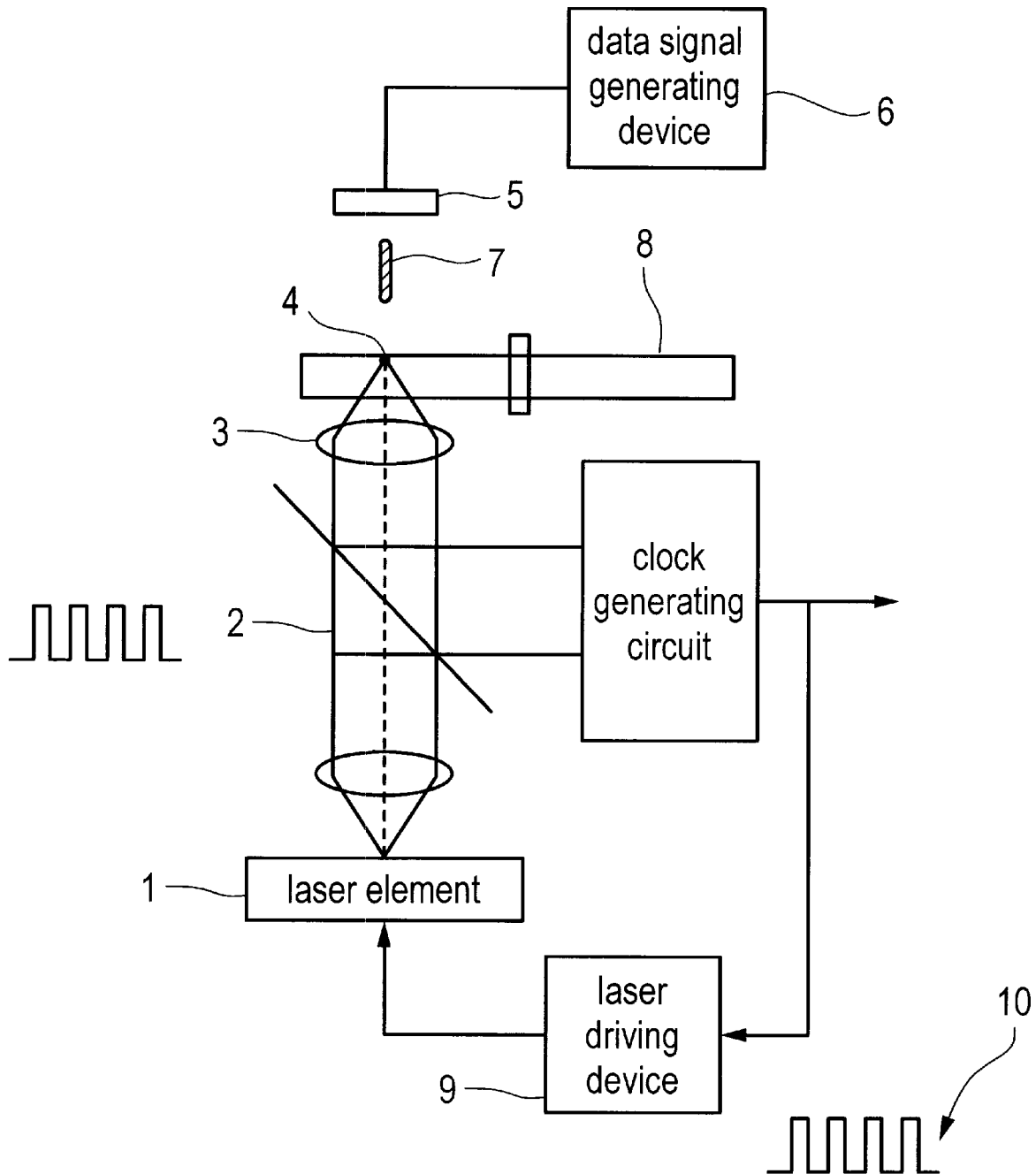
Figure 4B:
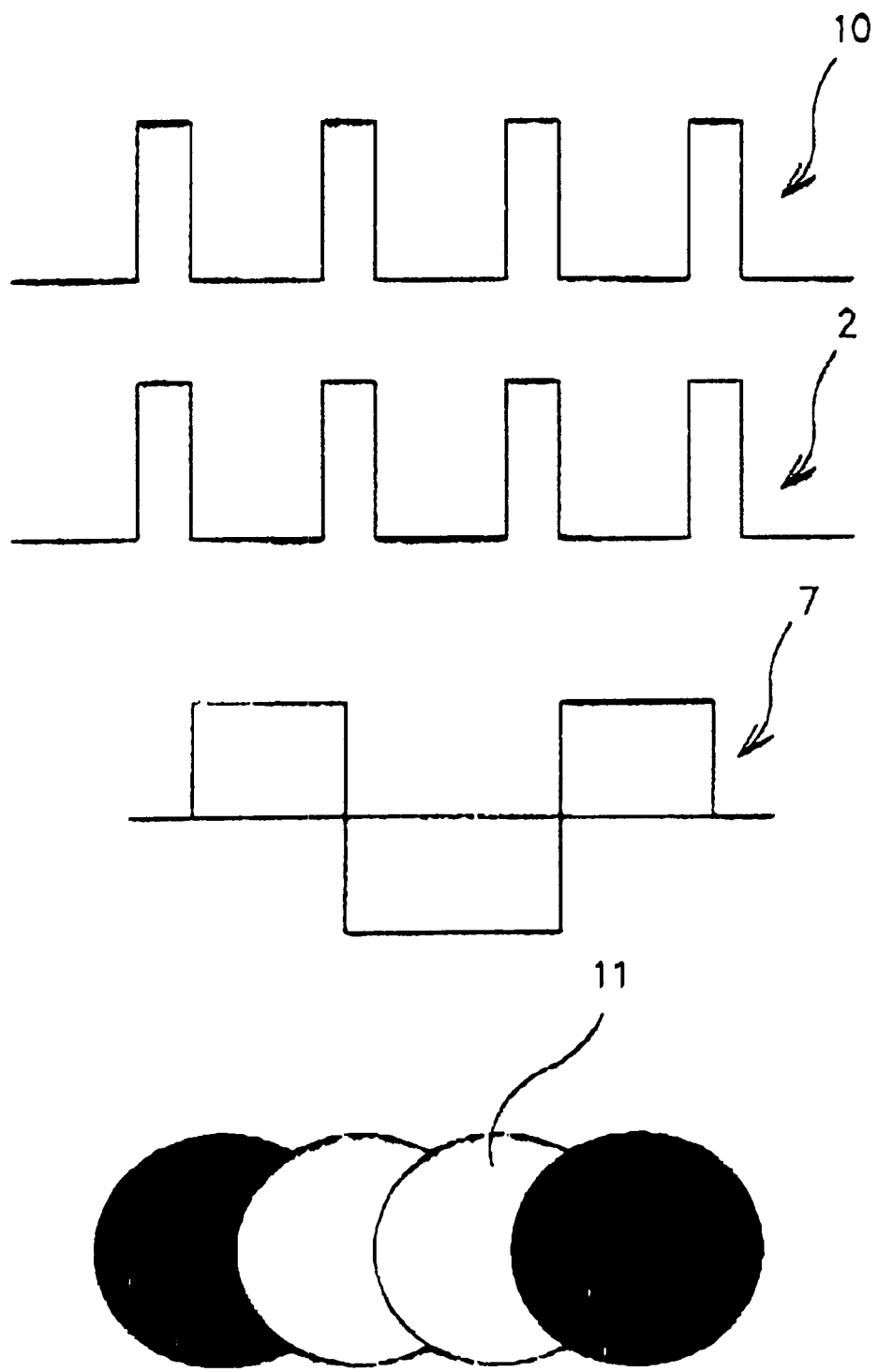

Referring to FIG. 1a, a laser element 1, for example, a semiconductor laser having a wavelength $0.68\mu$, is driven by a laser pulse driving device 18 to emit laser beam pulses at a frequency higher than the highest frequency of the magnetic data recorded in the recording method explained in association with FIG. 4. Pulses which cause the laser 1 to emit laser element beam pulses as shown as waveform 27 may be generated either by the laser pulse driving device 18, or by a clock generating circuit 30 based on the information from a disk 8. These pulses 27 of laser beam 17 are focused onto a magnetooptic recording medium 8 by an objective lens 3, reflected to pass through the objective lens 3 again, and reflected by a polarized beam splitter 19a to be incident upon a polarized beam splitter 19b, a P polarized component of which is transmitted through the polarized beam splitter 19b and an S polarized component of which is reflected at the polarized beam splitter 19b. The P and S polarized components are focused onto photodiodes 22 and 23 by focusing lenses 20 and 21 and subjected to photoelectric conversion, respectively. Electric signals from the photoelectric conversion are provided to a differential amplifier 24 to be amplified and differentiated. An output 28 from this differential amplifier 24 passes through a low pass filter 25 to remove unwanted pulse modulated signals mixed with the recorded data, thereby a desired reproduced signal 29 can be obtained. FIG. 1b illustrates a waveforms generated in the reproducing process of the present invention. Since the output 28 from the differential amplifier 24 has a signal of the pulses imposed on an original signal which is intended to reproduce, the output can not be detected as the recorded signal. Therefore, the low pass filter 25 is used for flattening the mixed pulse modulated signal using a frequency higher than the highest frequency of the recorded signal, to obtain the desired reproduced signal 29.

Figure 2A:
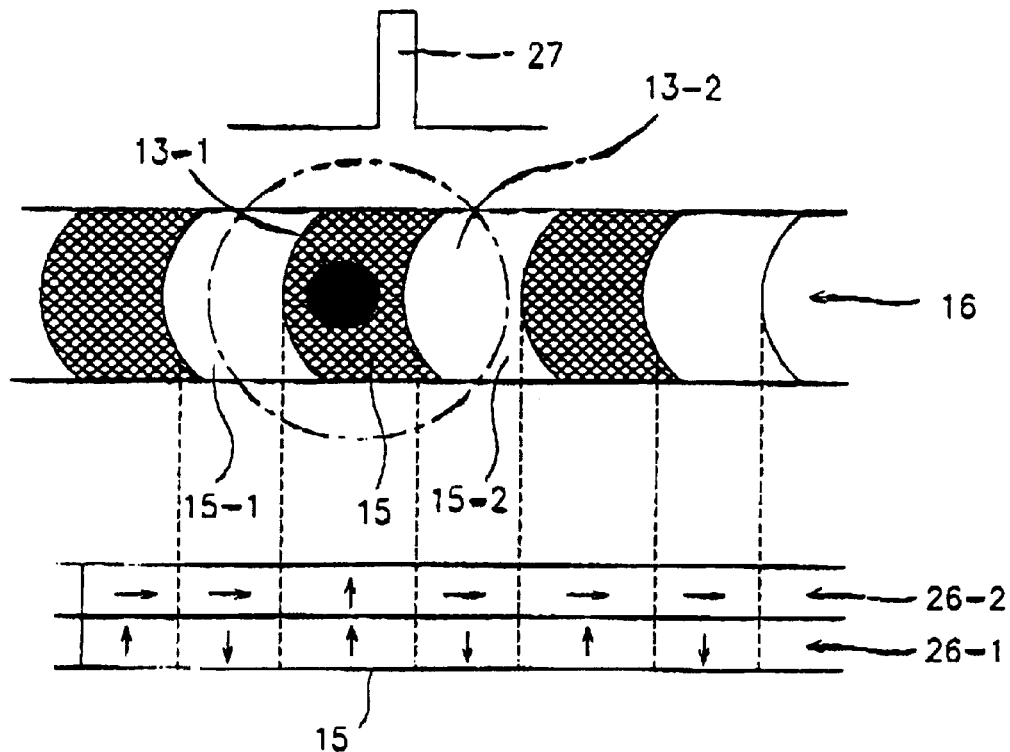
FIGS. 2a and 2b illustrate views for explaining a reproducing device in which laser beam pulses used in the present invention are directed for reproducing a magnetic super resolution film.
Figure 2B:
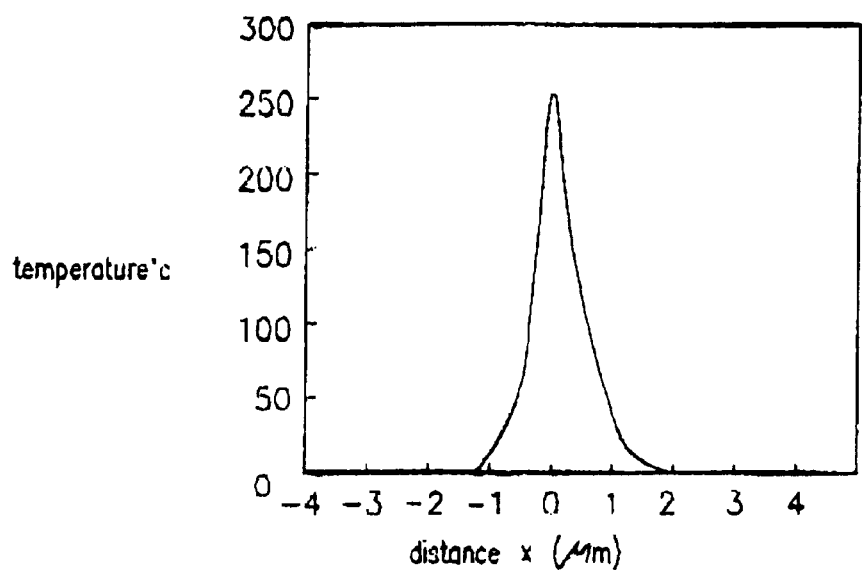

FIGS. 2a and 2b explain the functions of a magnetooptic recording medium 8 in the magnetooptic data record reproducing device shown in FIG. 1a in accordance with one preferred embodiment of the present invention.

Referring to FIGS. 2a and 2b, a magnetic film on the magnetooptic recording medium 8 has 2~4 layers of magnetooptic films having magnetooptic properties different from one another. Although FIG. 2a shows a bilayered film composed of a vertical magnetic film which is a recording layer 26-1 formed of, for example DyFeCo, and an in-surface magnetic film which is a reproducing layer 26-2 formed of, for example GdFeCo, the magnetic film construction is not limited to the illustrated configuration; but may have any known structure, such as the structure shown in FIG. 3a. If a width of the laser pulse beam 27 is narrowed to, for example, 5~200 nsec (nanosecond) depending on the shortest mark frequency in reproduction, when the laser pulse beam 27 is focused onto the recording track 16 of the medium 8, a center portion of the optical spot is locally heated to a high temperature to clearly define a temperature slope between a high temperature region 13-1 and a low temperature region 13-2 of the optical spot. As a result, within the optical spot, since the high temperature region 13-1 in the center portion becomes more narrower and magnetic pits 15-1 and 15-2 in the low temperature region 13-2 are masked by the in-surface magnetic film 26-2, a smaller magnetic pit 15 can be read. And, a positional deviation between the high temperature region 13-1 and the laser spot becomes very little, improving the efficiency of irradiation to a recording magnetic domain that is intended to be reproduced and a CNR (Carrier Noise Ratio), substantially. Further, the easy security of reproduction signal objective allows simplification in processing of, such as PRML (Partial Response Maximum Likelihood).

Figure 3B:
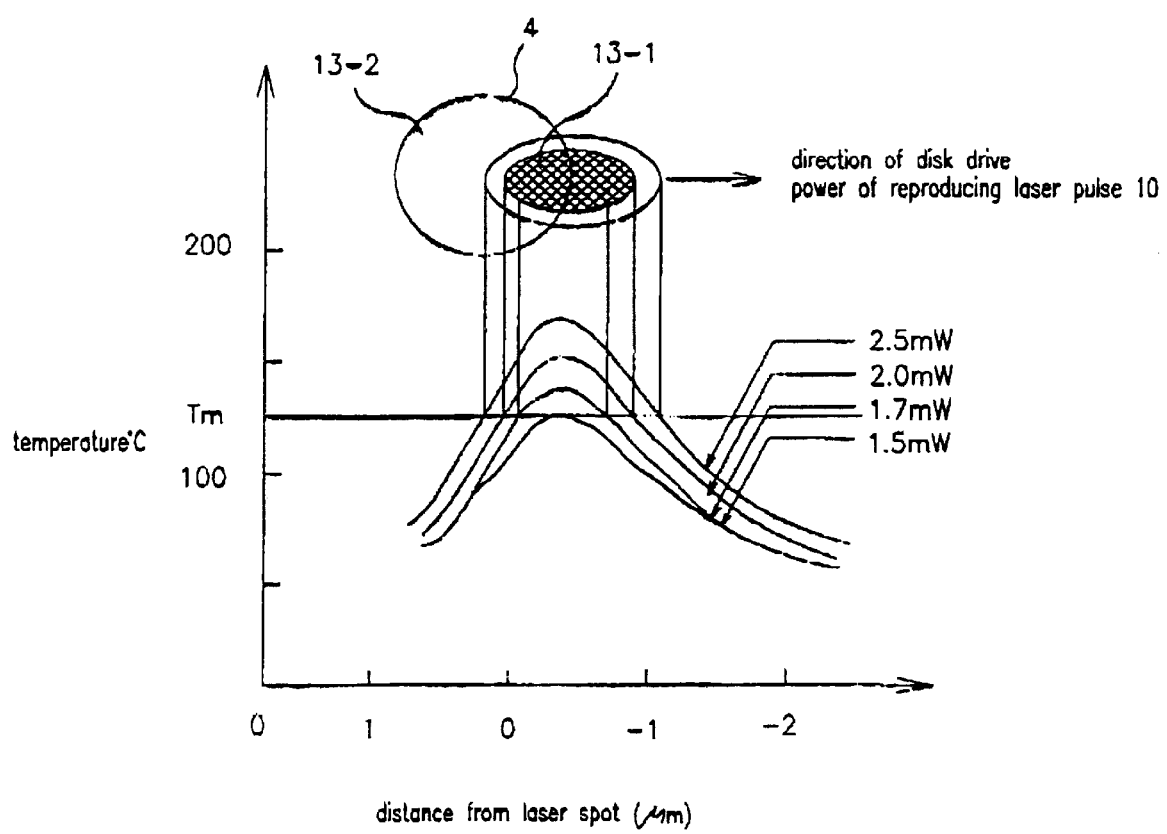

As has been explained, the incident pulse of the laser beam during reproduction in the present invention provides a sharp temperature distribution as shown in FIG. 2b compared to the moderate temperature distribution in the case of a conventional incident current laser beam incident shown in FIG. 3. This difference enables the system to accurately reproduce data from a magnetic pit 15 that is significantly smaller than the optical spot 4.

By local heating of a magnetic pit intended to read with a pulsed laser beam having a frequency higher than the highest frequency of the data recorded on a magnetooptic disk, the device of the present invention can affect the stable reproduction of data from a magnetic super resolution film. Further, by reproducing a reproducing signal through a low pass filter, the device of the present invention can perform a fast and stable reproduction of magnetic pits in the disk.

It will be apparent to the those skilled in the art that various modifications and variations can be made in the magnetooptic data record reproducing device of the present invention without departing from the spirit or scope of the invention. Thus, it is intended that the present invention cover the modifications and variations of this invention provided they come within the scope of the appended claims and their equivalents.

What is claimed is:

1. A data reproducing device for reproducing data recorded on a magneto-optic recording medium, the magneto-optic record medium having at least a recording layer and a reproducing layer, the device comprising:

a beam directing unit for directing a pulsed laser beam having a frequency higher than a frequency of any data signal recorded on said recording layer to reproduce the recorded data;

a processing unit for detecting first and second polarized components of the pulsed laser beam reflected from the magneto-optic recording medium and corresponding to a direction of magnetization transferred from said recording layer to said reproducing layer, and outputting a RF signal based on this detection; and a low pass filter for filtering the RF signal to generate a reproduction signal representing the data recorded on said recording layer.

2. The device as claimed in claim 1, wherein the processing unit includes first and second photodetectors for detecting the first and second polarized components of the pulsed laser beam reflected from the magneto-optic recording medium, respectively, and outputting first and second detection signals based on the detected first and second polarized components, respectively.

3. The device as claimed in claim 1, further comprising:

a laser source for generating the pulsed laser beam towards the magneto-optic recording medium; and a driving unit for driving the laser source to generate the pulsed laser beam having the frequency higher than the frequency of any data signal recorded on the magneto-optic recording medium.

4. The device as claimed in claim 1, wherein the processing unit includes:

a first beam splitter for directing the pulsed laser beam reflected from the magneto-optic recording medium towards a second beam splitter;

the second beam splitter for separating the first and second polarized components of the reflected pulsed laser beam from each other and directing the first and second polarized components of the reflected pulsed laser beam into different directions;

a first photodiode for receiving the first polarized component of the reflected pulsed laser beam from the second beam splitter; and a second photodiode for receiving the second polarized component of the reflected pulsed laser beam from the second beam splitter.

5. The device as claimed in claim 2, further comprising:

a clock signal generating unit for generating a clock signal based on an output of the second photodetector of the processing unit, the clock signal being used by a driving unit to generate the pulsed laser beam according to the clock signal.

6. A data reproducing device for reproducing data recorded on a magneto-optic recording medium, the magneto-optic recording medium having at least a recording layer and a reproducing layer, the device comprising:

a beam directing unit for directing a pulsed laser beam having a frequency higher than a frequency of any data signal recorded on said recording layer to reproduce the recorded data;

a processing unit for detecting first and second polarized components of the pulsed laser beam reflected from the magneto-optic recording medium and corresponding to a direction of magnetization transferred from said recording layer to said reproducing layer, and outputting a RF signal based on this detection; and a low pass filter for removing a high frequency pulse modulated signal included in the RF signal from the RF signal.

7. The device as claimed in claim 6, wherein the processing unit includes first and second photodetectors for detecting the first and second polarized components of the pulsed laser beam reflected from the magneto-optic recording medium, respectively, and outputting first and second detection signals based on the detected first and second polarized components, respectively.

8. The device as claimed in claim 6, further comprising:

a laser source for generating the pulsed laser beam towards the magneto-optic recording medium; and a driving unit for driving the laser source to generate the pulsed laser beam having the frequency higher than the frequency of any data signal recorded on the magneto-optic recording medium.

9. The device as claimed in claim 6, wherein the processing unit includes:

a first beam splitter for directing the pulsed laser beam reflected from the magneto-optic recording medium towards a second beam splitter;

the second beam splitter for separating the first and second polarized components of the reflected pulsed laser beam from each other and directing the first and second polarized components of the reflected pulsed laser beam into different directions;

a first photodiode for receiving the first polarized component of the reflected pulsed laser beam from the second beam splitter; and a second photodiode for receiving the second polarized component of the reflected pulsed laser beam from the second beam splitter.

10. The device as claimed in claim 7, further comprising:

a clock signal generating unit for generating a clock signal based on an output of the second photodetector of the processing unit, the clock signal being used by a driving unit to generate the pulsed laser beam according to the clock signal.

11. A data reproducing method for reproducing data recorded on a magneto-optic recording medium, the magneto-optic record medium having at least a recording layer and a reproducing layer, the method comprising the steps of:

directing a pulsed laser beam having a frequency higher than a frequency of any data signal recorded on said recording layer to reproduce the recorded data;

detecting first and second polarized components of the pulsed laser beam reflected from the magneto-optic recording medium and corresponding to a direction of magnetization transferred from said recording layer to said reproducing layer, and outputting a RF signal based on this detection; and filtering the RF signal to generate a reproduction signal representing data recorded on said recording layer.

12. The method as claimed in claim 11, wherein said detecting step detects the first and second polarized components of the pulsed laser beam reflected from the magneto-optic recording medium, using first and second photodetectors, respectively, and outputs first and second detection signals based on the detected first and second polarized components, respectively.

13. The method as claimed in claim 11, wherein said directing step includes the steps of:

generating, using a laser source, the pulsed laser beam towards the magneto-optic recording medium; and driving the laser source to generate the pulsed laser beam having the frequency higher than the frequency of any data signal recorded on the magneto-optic recording medium.

14. The method as claimed in claim 11, further comprising:

directing, using a first beam splitter, the pulsed laser beam reflected from the magneto-optic recording medium towards a second beam splitter;

separating, using the second beam splitter, the first and second polarized components of the reflected pulsed laser beam from each other and directing the first and second polarized components of the reflected pulsed laser beam into different directions;

receiving, by a first photodetector, the first polarized component of the reflected pulsed laser beam from the second beam splitter; and receiving, by a second photodiode, the second polarized component of the reflected pulsed laser beam from the second beam splitter.

15. The method as claimed in claim 12, further comprising the step of:

generating a clock signal based on an output of the second photodetector, the clock signal being used by a driving unit to generate the pulsed laser beam according to the clock signal.

16. A data reproducing method for reproducing data recorded on a magneto-optic recording medium, the magneto-optic recording medium having at least a recording layer and a reproducing layer, the method comprising the steps of:

directing a pulsed laser beam having a frequency higher than a frequency of any data signal recorded on said recording layer to reproduce the recorded data;

detecting first and second polarized components of the pulsed laser beam reflected from the magneto-optic recording medium and corresponding to a direction of magnetization transferred from said recording layer to said reproducing layer, and outputting a RF signal based on this detection; and removing a high frequency pulse modulated signal included in the RF signal from the RF signal.

17. The method as claimed in claim 16, wherein said detecting step detects the first and second polarized components of the pulsed laser beam reflected from the magneto-optic recording medium, using first and second photodetectors, respectively, and outputs first and second detection signals based on the detected first and second polarized components, respectively.

18. The method as claimed in claim 16, wherein said directing step includes the steps of:

generating, using a laser source, the pulsed laser beam towards the magneto-optic recording medium; and driving the laser source to generate the pulsed laser beam having the frequency higher than the frequency of any data signal recorded on the magneto-optic recording medium.

19. The method as claimed in claim 16, further comprising:

directing, using a first beam splitter, the pulsed laser beam reflected from the magneto-optic recording medium towards a second beam splitter;

separating, using the second beam splitter, the first and second polarized components of the reflected pulsed laser beam from each other and directing the first and second polarized components of the reflected pulsed laser beam into different directions;

receiving, by a first photodetector, the first polarized component of the reflected pulsed laser beam from the second beam splitter; and receiving, by a second photodiode, the second polarized component of the reflected pulsed laser beam from the second beam splitter.

20. The method as claimed in claim 17, further comprising the step of:

generating a clock signal based on an output of the second photodetector, the clock signal being used by a driving unit to generate the pulsed laser beam according to the clock signal.

* * * * *